United States Patent [19]

Berarducci

[11] Patent Number: 5,303,363
[45] Date of Patent: Apr. 12, 1994

[54] IMAGE PROCESSING APPARATUS HAVING DISK STORAGE RESEMBLING RAM MEMORY

[75] Inventor: Thomas N. Berarducci, Webster, N.Y.

[73] Assignee: Eastman Kodak Company, Rochester, N.Y.

[21] Appl. No.: 971,680

[22] Filed: Nov. 4, 1992

Related U.S. Application Data

[63] Continuation of Ser. No. 457,054, Dec. 19, 1989, abandoned.

[51] Int. Cl.⁵ .............................................. G06F 13/12
[52] U.S. Cl. ............................. 395/425; 364/DIG. 1
[58] Field of Search ... 364/200 MS File, 900 MS File; 395/400 MS, 425 MS

[56] References Cited

U.S. PATENT DOCUMENTS

| | | | |
|---|---|---|---|
| 4,694,396 | 9/1987 | Weisshaar | 364/200 |
| 4,754,394 | 6/1988 | Brantley, Jr. et al. | 364/200 |
| 4,811,284 | 3/1989 | Adler et al. | 364/900 |
| 4,835,685 | 5/1989 | Kun | 364/200 |
| 4,920,478 | 4/1990 | Furuya et al. | 395/425 |
| 4,984,149 | 1/1991 | Iwashita et al. | 395/425 |
| 4,985,848 | 1/1991 | Pfeiffer et al. | 364/518 |
| 5,185,877 | 2/1993 | Bissett et al. | 395/425 |

Primary Examiner—Joseph L. Dixon
Assistant Examiner—Reba I. Elmore
Attorney, Agent, or Firm—Thomas H. Close

[57] ABSTRACT

An processing system having a disk storage unit which acts as physical RAM storage. A disk controller, disk and small RAM unit are controlled by a separate CPU and MMU using a virtual memory scheme. This assembly is connected to a set of processing nodes by way of a bus, such that each of the nodes can access the memory directly through the MMU as virtual memory. The CPU controls the transfer of data to and from the disk as it is requested from the nodes. The nodes may then proceed to process the image data without any interaction with the host system.

12 Claims, 3 Drawing Sheets

IMAGE PROCESSING APPARATUS HAVING DISK STORAGE RESEMBLING RAM MEMORY

This application is a continuation of application Ser. No. 07/457,054, filed Dec. 26, 1989, now abandoned.

BACKGROUND OF THE INVENTION

1. Field of the Invention

This invention relates generally to an image processing apparatus and more particularly to an image processing apparatus having a plurality of nodes with access to disk storage.

2. Discussion of the Background

Advances in computer technology have allowed many problems to be solved due to the continuing increase in the power, size and speed of computing systems. In some areas, such as image processing, any advance in speed and power of the computer or decrease in cost is welcome due to the complexity of the problems solved.

One advance which has recently been helpful in this area is the use of pipeline processor devices. Such a device is shown in U.S. Pat. No. 4,464,788. The use of such pipeline processing systems speeds up the processing of the image. Other examples of pipeline processors are shown in U.S. Pat. Nos. 4,101,960, 4,620,275 and 4,621,399.

Another typical type of image processor is shown in FIG. 1. The system is used as a peripheral device 12 which is connected to a host such as a workstation 10 or similar computer. The workstation is connected through an adapter 14 to a local bus 26 of the peripheral. Also connected to this bus are a series of nodes 24 which process the image, a disk controller 18 which controls a storage disk 20, a RAM 22 and a host CPU 16. While this system has many improvements over earlier devices, it is limited in that only the host CPU or workstation 10 (but not both) has direct access to the disk. This means that the speed at which information is moved from the disk to the various nodes is limited. It also means that a relatively complex input/output program must be written by the programmer to control the movement of this information. Another limitation is that the RAM must be relatively large to accommodate this system.

Some improvement can be made over this system by utilizing a virtual memory adaptation. That is, the disk and RAM operate together under the control of the host CPU using a virtual memory addressing scheme. This allows the RAM to be smaller, thus decreasing the cost of the device. However, the other problems described above still remain.

SUMMARY OF THE INVENTION

Accordingly, one object of this invention is to provide a novel image processing apparatus with a simplified architecture.

Another object of this invention is to provide a novel processing apparatus where the processing nodes are identical, thus providing a lower cost.

A further object of this invention is to provide a novel processing system where disk storage appears to the user as physical RAM storage.

A still further object of this invention is to provide a novel system where the programming for moving data in and out of the disk is eliminated by using virtual memory.

A still further object of this invention is to provide a novel image processing system wherein the programming is simplified and where the processing nodes can be made cheaply and where the speed of the apparatus remains high.

A still further object of this invention is to provide a novel processing system having an architecture which allows multiple processors direct access to a disk storage subsystem with no outside intervention.

Briefly, these and other objects of the invention are achieved by providing a "DISKRAM" system where the disk storage appears to the system to be physical RAM memory, in such a way that nodes can each access the disk directly. This DISKRAM subsystem includes its own CPU controller, RAM memory, disk controller and disk.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
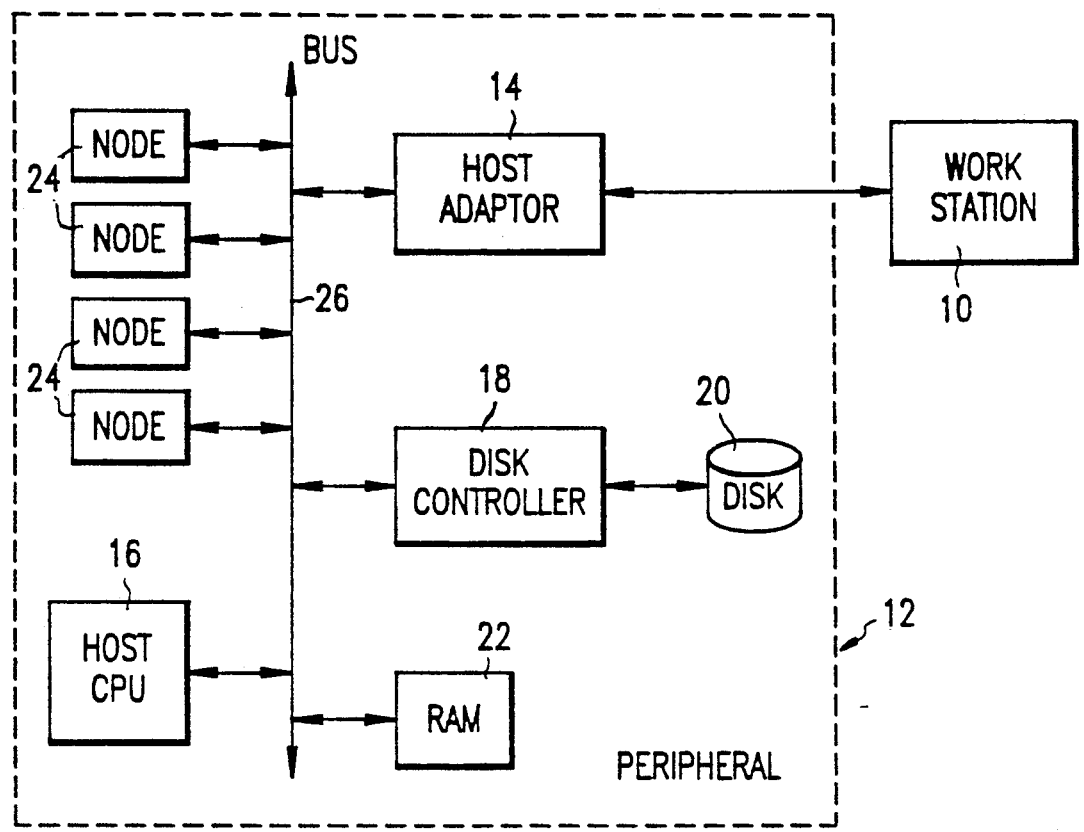
FIG. 1 i a block diagram showing a prior art system.
Figure 2:
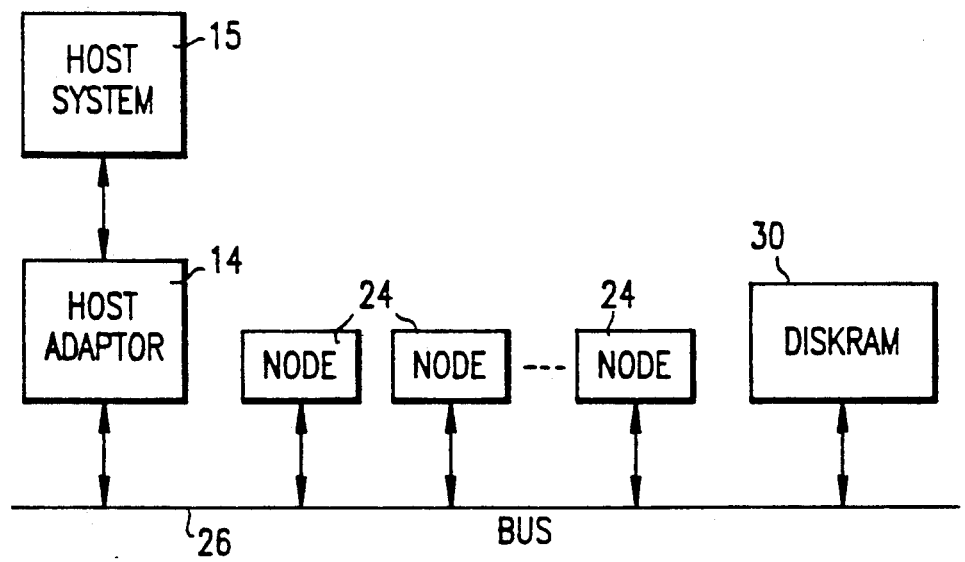
FIG. 2 is a block diagram showing a simplified description of the present invention.

Referring now to the drawings, wherein like reference numerals designate identical or corresponding parts throughout the several views, and more particularly to FIG. 2 which shows a simplified arrangement of the present invention. A plurality of nodes 24 are connected by way of a local bus 26. Each node includes a high speed CPU, I/0 interface and cache memory. Also connected to the local bus is the DISKRAM memory system 30 and a host system 15 through host adaptor 14. The host system 15 is similar in function to the workstation 10 in FIG. 1.

Each node has complete bus master capability and all nodes have equal priority. The nodes can access a large global address space linearly without any special provisions. Most of the address space will be accessed through the DISKRAM system that makes disk storage look like physical RAM memory. This is accomplished by using a virtual memory scheme in hardware.

Figure 3:
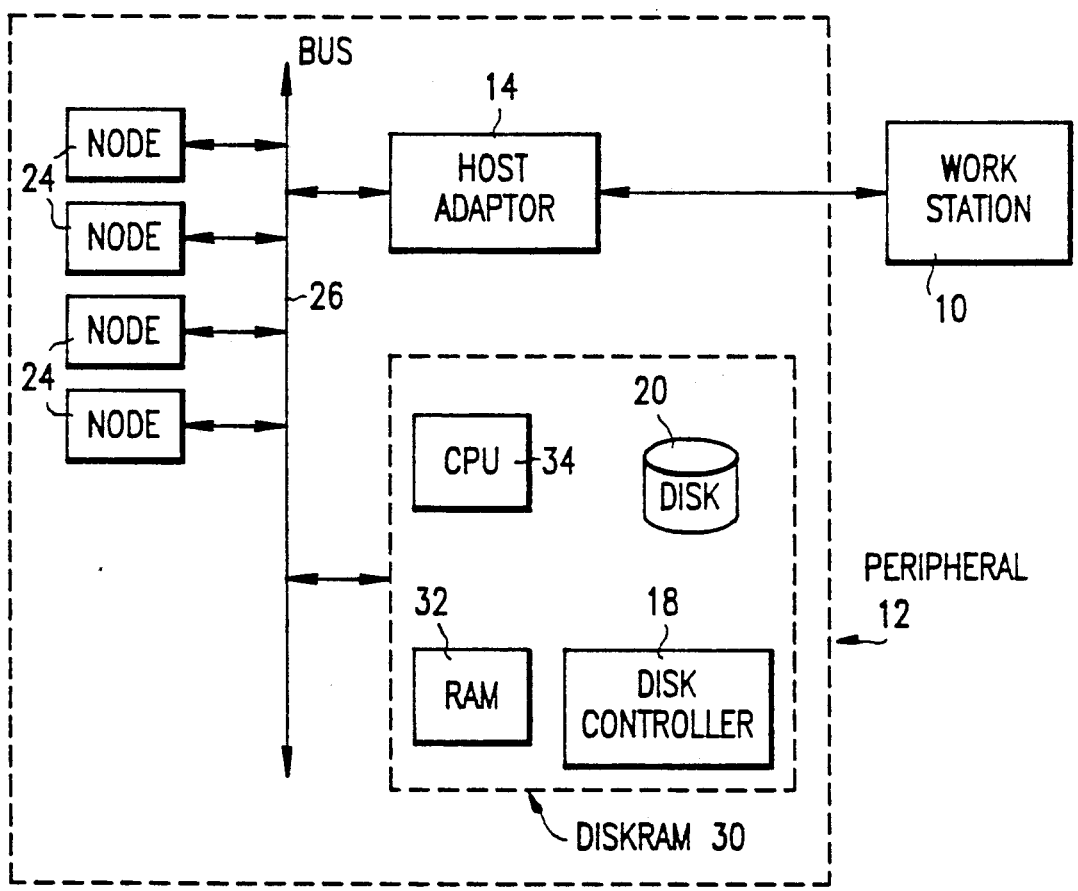
FIG. 3 is a block diagram showing an embodiment of the present invention.

FIG. 3 shows a more complete description of the architecture of the system. This particular arrangement is based on the prior art device shown in FIG. 1 with the necessary modifications to accommodate the DISKRAM system. Thus, this system includes a host workstation 10 and a host adapter or interface 14 connected to a local bus 26 as in the prior art. A plurality of nodes 24 are also connected as in FIG. 1. However, in place of the previous disk, disk controller and RAM, a new DISKRAM system 30 has been implemented. This system includes a separate CPU 34, PAGE RAM 32, disk controller 18 and disk 20. These four items make up the DISKRAM and are connected in a virtual memory scheme. Under this arrangement, the CPU 34 controls the loading of data from storage disk 20 into the PAGE RAM 32 without intervention by the host workstation.

The nodes 24 can directly access the disk 20 via the PAGE RAM 32 as a virtual resource.

Accordingly, the image data movement can take place transparent to the programmer. The programmer's job is accordingly reduced significantly because only the algorithm rather than complex I/0 routines need be written. It also removes any restrictions on image size for processing so the job of the programmer is made even easier since this is not necessary in writing the algorithm. Thus, for example, the following routine could be used to fill a 64 Mbyte block of memory using DISKRAM.

| 64-MByte Block Fill Routine | |
| --- | --- |
| testvm() | /*Block Fill Application Program */ |
| { | |
| clear(0x04000000, 67108860) | /*clear 64 Mbytes starting at */ |
| return(0); | |
| } | /*address 4,000,000 hex */ |
| clear(bp,size) | /*Clear Subprogram */ |
| unsigned *bp,size: | |
| { | |
| unsigned i: | |
| for(i=0;i<size;i++) | |
| { | |
| *bp=0 | |
| bp++; | |
| } | |
| } | |

Since typically the available PAGE RAM size is much smaller, for example 512K bytes, hundreds of page swaps must be executed to complete this task. However, the programmer sees only a linear address space. This is completely analogous to traditional virtual memory, except the DISKRAM makes it possible for multiple processors to access the virtual resource simultaneously, without host intervention.

By using DISKRAM, all node processors have complete access to the entire space making it as easy to perform complex algorithms on very large images as it is to perform simple point operations on small images. Thus, image processing algorithms can be written in a much higher level of abstraction, relieving the programmer of much of the hardware depending coding.

Another advantage of using this system is that the nodes can be made identical which decreases the cost of the system. That is, any necessary specific hardware can be incorporated into the DISKRAM system allowing for standard parts to be used in the nodes. This decreases the cost of the system. Also, no host CPU 16 is necessary.

Figure 4:
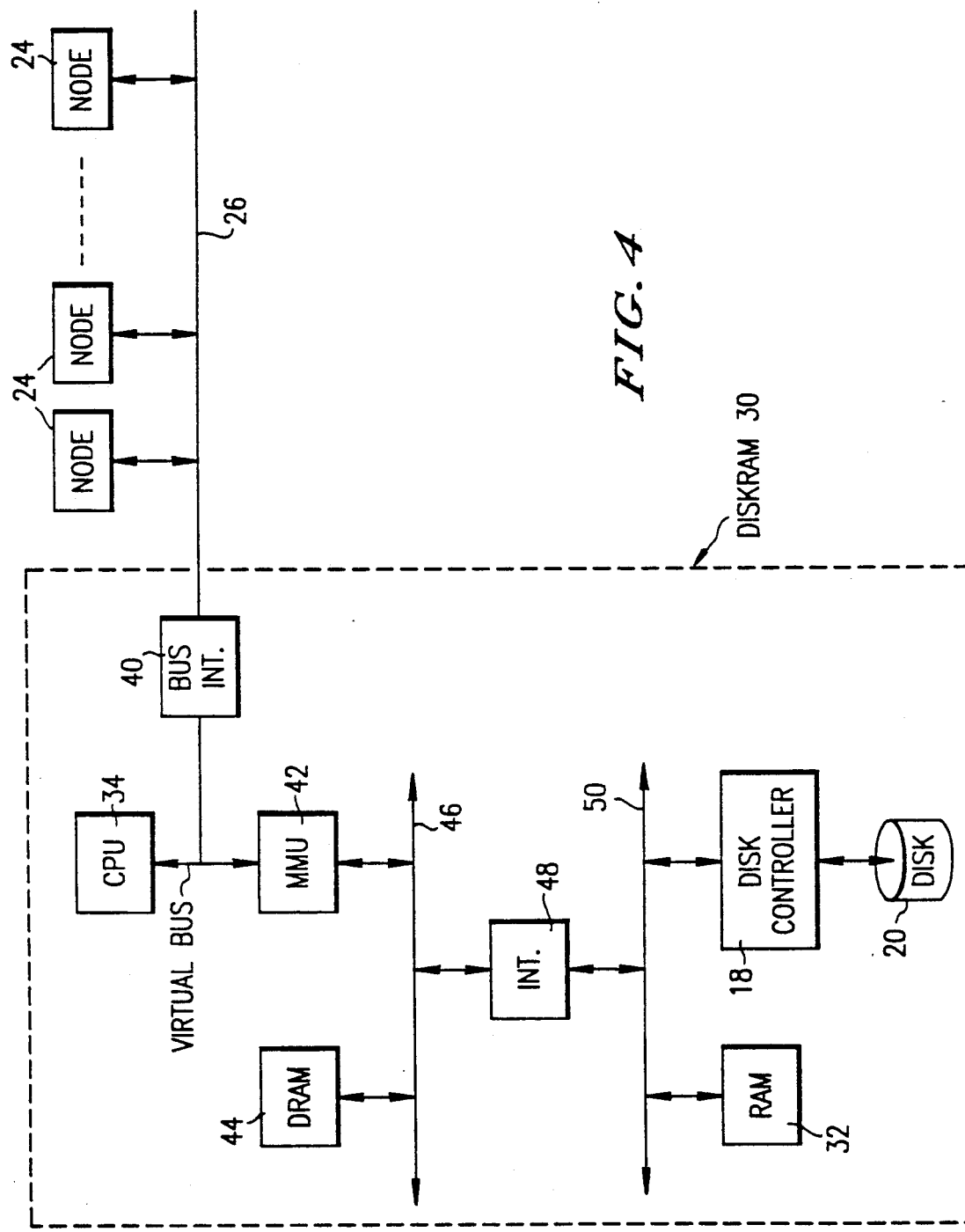
FIG. 4 is a block diagram showing more detail of a DISKRAM board in the embodiment of FIG. 3.

FIG. 4 shows a more detailed configuration of the DISKRAM system. Contents of the DISKRAM are indicated by box 30. Nodes 24 are connected to the DISKRAM through bus 26 as described FIG. 3. CPU 34 controls the operation of the DISKRAM and is connected to the system bus by way of bus interface 40. The CPU is also connected to a Memory Management Unit (MMU) 42 by way of a virtual bus, as is known. The MMU is connected to a local RAM 44 by way of local bus 46. Also connected to this bus is an interface 48 which is connected to an additional bus 50. This bus connects RAM 32 and disk controller 18. The disk controller is also connected to disk 20.

The DISKRAM CPU issues accesses in virtual address space with the MMU translating the virtual addresses into physical addresses. If the desired data resides in the physical RAM it is accessed across the necessary buses. If the data needs to be retrieved from the disk, the CPU will tell the disk controller what data to move into and out of the physical RAM to accomplish this. The MMU page table can be updated and processing continues as normal.

Since each of the nodes contains a CPU which is also connected to the MMU through bus interface 40, the nodes also can access the data by issuing data references in the same virtual space. Accordingly, while the DISKRAM CPU 34 controls the operation of the DISKRAM board, the nodes can access the data directly. The only problem occurs when there is a "fault", that is when the desired data is not currently in physical RAM. In this case, the DISKRAM CPU 34 is interrupted, and the node access is temporarily suspended to allow the CPU 34 to handle the fault. After the data has been placed in physical memory, the node causing the fault can then retry its access with a successful result.

As can be seen, with the exception of the MMU, the hardware necessary to implement the DISKRAM is almost identical in the number of parts to the prior art and accordingly in cost to a standard disk controller but is merely assembled in a different fashion, namely by providing shared access to the logical address bus by any number of alternate logical bus masters. By using this design the remaining parts of the system design become simpler and accordingly less expensive. As pointed out above, this system allows simplicity for the programmer and requires no software changes over other basic systems Large amounts of storage can be accessed by many different system components at a relatively low cost.

Obviously, numerous modifications and variations of the present invention are possible in light of the above teachings. It is therefore to be understood that within the scope of the appended claims, the invention may be practiced otherwise than as specifically described herein

What is claimed as new and desired to be secured by Letters Patent of the United States is:

1. A processing system, comprising:
   a common memory bus;
   processing nodes connected to said memory common bus, each of the nodes performing processing and requesting data by producing virtual memory addresses for memory accesses to random access type memory locations; and
   a memory system connected to said common bus, receiving the memory accesses to the random access type memory locations over said common memory bus and comprising a single unit including:
   a bus interface connected to said common memory bus;
   a storage disk to store data;
   a disk controller connected to the storage disk to control storage and retrieval of the data from the storage disk;
   RAM memory connected to the disk controller;
   a control processor coupled to said disk controller, said RAM memory and said bus interface sand controlling all virtual memory management to satisfy the memory accesses including movement of data between said RAM memory and said storage disk;
   a virtual address bus coupled to said bus interface; and a memory management unit coupled to said virtual address bus and said control processor and comprising means for receiving the virtual memory addresses from said virtual address bus and translating the virtual addresses into physical addresses.

2. A processing system according to claim 1, wherein each of said nodes includes a CPU connected to the common memory bus for processing images.

3. A processing system according to claim 2, wherein the CPU in each of the nodes includes said common memory bus for directly accessing the memory system forming a single shared address space.

4. A processing system according to claim 3, wherein each of said nodes further comprises:
an I/O interface connected to said common bus; and
a cache memory connected to said I/O interface.

5. A processing system according to claim 1, wherein the memory system further comprises the bus interface connected to the nodes by the common memory bus and connected to the virtual address bus.

6. A processing system according to claim 5, wherein the memory system further comprises:
a local RAM of said single unit; and
a local bus of said single unit connected to said memory management unit and the local RAM.

7. A processing apparatus, comprising:
processing unit node producing virtual memory addresses for memory accesses to random access type memory locations;
a common memory bus connecting said nodes and carrying the memory access; and
a memory system connected to said common memory bus, receiving the memory accesses to the random access type memory locations over said common memory bus and comprising a single unit including:
a storage disk;
a disk controller operatively connected to said storage disk;
a local single unit bus connected to said disk controller;
RAM memory connected to said single unit local bus;
a virtual address and data bus;
a memory management unit connected to said local single unit bus and said virtual address and data bus and comprising means for receiving the virtual memory addresses from said virtual address and data bus and translating the virtual addresses into physical addresses;
a bus interface connected between said virtual address and data bus and said common memory bus; and
a CPU connected to said virtual address and data bus, said RAM memory and said disk controller and controlling all virtual memory management to satisfy the memory accesses including movement of data between said RAM memory and said storage disk.

8. An apparatus according to claim 7, wherein each of the nodes includes means for requesting data, and said CPU includes means for controlling the disk controller to move the data from said storage disk to said RAM memory when the data requested by one of the nodes is not stored said RAM memory.

9. An apparatus according to claim 7, wherein said memory management unit comprises means for temporarily suspending a particular access by one of the nodes making a request for data not stored in said RAM memory and allowing other accesses by one of the nodes to control, and said CPU includes means for controlling moving of the data from said storage disk by said disk controller to said RAM memory after said memory management unit suspends access.

10. An apparatus according to claim 7, wherein said CPU includes means for requesting data and for controlling the disk controller to move the data from said storage disk by said disk controller to said RAM memory when the data requested is not stored in said RAM memory.

11. An apparatus according to claim 7, wherein said CPU and each of the plurality of nodes includes means for requesting data from the RAM memory, and said memory management unit comprises means for generating a fault when the data requested is not stored in said RAM memory.

12. An apparatus according to claim 11, wherein said memory management unit comprises means for temporarily suspending access by one of the nodes making a request for data not stored in said RAM memory, and said CPU includes means for controlling moving of the data from said storage disk to said RAM memory after said memory management unit suspends access.

* * * * *